United States Patent
Kim et al.

(10) Patent No.: US 9,936,038 B2
(45) Date of Patent: Apr. 3, 2018

(54) METHOD OF CACHING CONTENTS BY NODE AND METHOD OF TRANSMITTING CONTENTS BY CONTENTS PROVIDER IN A CONTENT CENTRIC NETWORK

(71) Applicants: Samsung Electronics Co., Ltd., Suwon-si (KR); Ajou University Industry-Academic Cooperation Foundation, Suwon-si (KR)

(72) Inventors: Jae Hoon Kim, Yongin-si (KR); Young Bae Ko, Suwon-si (KR); Byoung Joon Lee, Seongnam-si (KR); Sung Won Lee, Suwon-si (KR); Sung Hwa Lim, Cheonan-si (KR); Myeong Wuk Jang, Hwaseong-si (KR); Gue Hwan Jung, Suwon-si (KR)

(73) Assignees: Samsung Electronics Co., Ltd., Suwon-si (KR); Ajou University Industry-Academic Cooperation Foundation, Suwon-si (KR)

( * ) Notice: Subject to any disclaimer, the term of this patent is extended or adjusted under 35 U.S.C. 154(b) by 666 days.

(21) Appl. No.: 14/099,120

(22) Filed: Dec. 6, 2013

(65) Prior Publication Data
US 2014/0164552 A1 Jun. 12, 2014

(30) Foreign Application Priority Data
Dec. 7, 2012 (KR) .................. 10-2012-0141743

(51) Int. Cl.
*G06F 15/16* (2006.01)
*H04L 29/08* (2006.01)
*H04L 12/747* (2013.01)

(52) U.S. Cl.
CPC ........ *H04L 67/2842* (2013.01); *H04L 45/742* (2013.01)

(58) Field of Classification Search
CPC .... H04L 67/2842; H04L 45/742; H04L 45/20
USPC ......................................................... 709/214
See application file for complete search history.

(56) References Cited

U.S. PATENT DOCUMENTS

| | | | |
|---|---|---|---|
| 7,574,538 B1 * | 8/2009 | Yochai | G06F 3/0613 710/36 |
| 7,818,446 B2 | 10/2010 | Katayama | |
| 8,311,543 B2 | 11/2012 | Dravida et al. | |
| 8,826,381 B2 * | 9/2014 | Kim | H04L 63/1458 726/22 |

(Continued)

FOREIGN PATENT DOCUMENTS

| | | |
|---|---|---|
| KR | 10-2010-0059117 A | 6/2010 |
| KR | 10-2011-0032162 A | 3/2011 |

(Continued)

*Primary Examiner* — Joseph E Avellino
*Assistant Examiner* — Binod J Kunwar
(74) *Attorney, Agent, or Firm* — NSIP Law

(57) ABSTRACT

A method of caching a content in a node in a content-centric network, includes receiving, from a content requester, a content request packet requesting a first chunk of the content, and setting a mark bit indicating whether the node is to cache the first chunk when the first chunk is received. The method further includes receiving, from a content provider, a data packet including the first chunk in response to transmitting the content request packet to the content provider, and caching the first chunk.

20 Claims, 11 Drawing Sheets

(56) References Cited

U.S. PATENT DOCUMENTS

| | | | | |
|---|---|---|---|---|
| 9,013,990 B2 * | 4/2015 | Lee | ................... | H04L 47/127 370/231 |
| 9,160,648 B2 * | 10/2015 | Hong | ................... | H04L 45/64 |
| 9,273,190 B2 * | 3/2016 | Faldysta | ................... | C08J 7/047 |
| 9,515,920 B2 * | 12/2016 | Zhang | ................... | H04L 45/306 |
| 2009/0287835 A1 * | 11/2009 | Jacobson | ................... | H04L 67/104 709/229 |
| 2009/0288163 A1 * | 11/2009 | Jacobson | ................... | G06F 15/173 726/22 |
| 2009/0316715 A1 * | 12/2009 | Saniee | ................... | H04N 7/17336 370/429 |
| 2010/0195655 A1 * | 8/2010 | Jacobson | ................... | H04L 45/00 370/392 |
| 2010/0217869 A1 | 8/2010 | Esteban et al. | | |
| 2012/0136945 A1 * | 5/2012 | Lee | ................... | H04L 67/2838 709/206 |
| 2012/0297088 A1 * | 11/2012 | Wang | ................... | H04L 63/0272 709/238 |
| 2012/0297410 A1 | 11/2012 | Lohmar et al. | | |
| 2013/0018937 A1 * | 1/2013 | Kim | ................... | G06F 17/30902 709/202 |
| 2013/0074155 A1 * | 3/2013 | Huh | ................... | H04L 63/065 726/3 |
| 2013/0151584 A1 * | 6/2013 | Westphal | ................... | H04L 67/06 709/202 |
| 2013/0163610 A1 * | 6/2013 | Ko | ................... | H04L 67/327 370/428 |
| 2013/0185406 A1 * | 7/2013 | Choi | ................... | H04L 67/2847 709/223 |
| 2013/0198351 A1 * | 8/2013 | Widjaja | ................... | H04L 67/2842 709/223 |
| 2013/0282854 A1 * | 10/2013 | Jang | ................... | H04L 67/10 709/213 |
| 2013/0282860 A1 * | 10/2013 | Zhang | ................... | H04L 45/306 709/217 |
| 2014/0089454 A1 * | 3/2014 | Jeon | ................... | H04L 67/2852 709/213 |

FOREIGN PATENT DOCUMENTS

| | | |
|---|---|---|
| KR | 10-1088022 B1 | 11/2011 |
| KR | 10-2012-0066061 A | 6/2012 |

\* cited by examiner

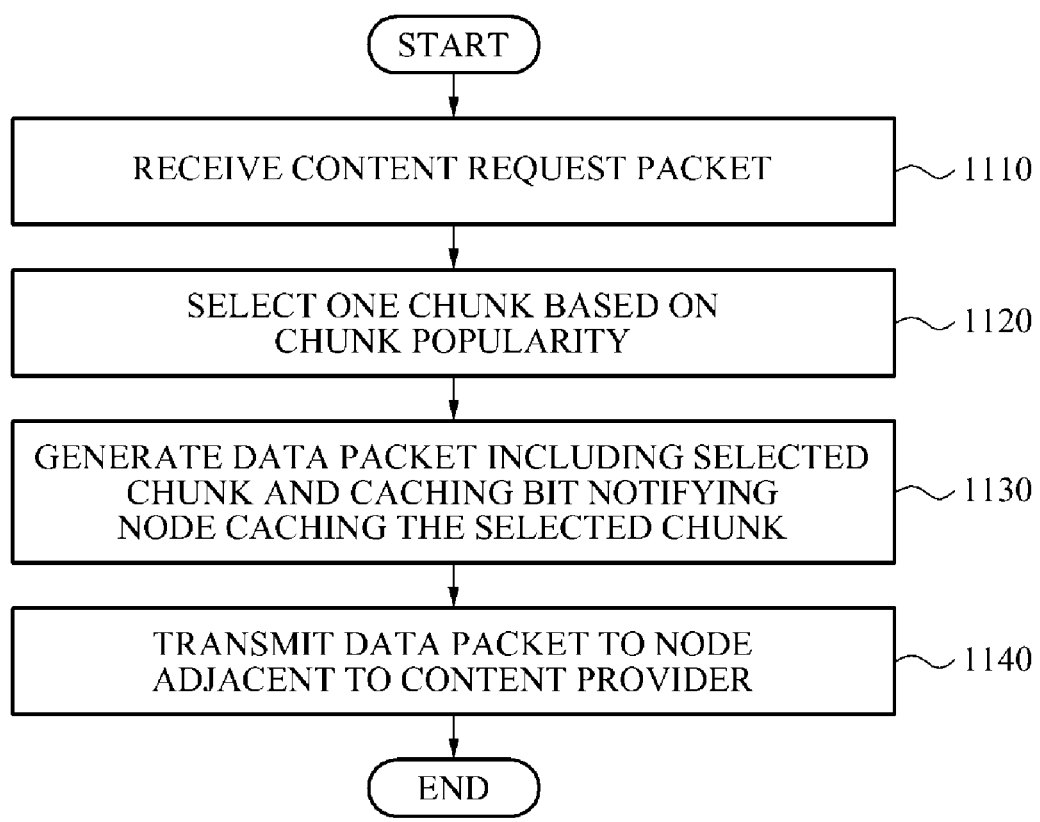

METHOD OF CACHING CONTENTS BY NODE AND METHOD OF TRANSMITTING CONTENTS BY CONTENTS PROVIDER IN A CONTENT CENTRIC NETWORK

CROSS-REFERENCE TO RELATED APPLICATION

This application claims the benefit under 35 USC 119(a) of Korean Patent Application No. 10-2012-0141743, filed on Dec. 7, 2012, in the Korean Intellectual Property Office, the entire disclosure of which is incorporated herein by reference for all purposes.

BACKGROUND

1. Field

The following description relates to a method of caching a content by a node and a method of transmitting a content by a content provider in a content-centric network (CCN).

2. Description of Related Art

A content-centric network (CCN) technique focuses on data rather than a location from which the data is to be retrieved, and thus, specifies a name of a content in a header of a packet, in contrast to an Internet Protocol (IP)-based network technique in which source and destination addresses are described in a header of a packet. Each router sets up a routing table, and using the routing table, a packet is forwarded to a location in which a content is present by referring to a header of the packet indicating a name of the content. In addition to the router, each network device includes a storage configured to temporarily store contents.

In a CCN, a packet is classified into a content request packet and a content reply packet. The content request packet includes a name of a requested content, and the content reply packet includes the requested content and the name of the requested content. When a content request packet is transmitted to a network device, the network device checks its storage for a corresponding content by a name of the content included in a header of the packet, and when the corresponding content is present in the storage, the network device sends a reply to the request by transmitting the content to a requester.

In a CCN, a node in which a requested content is present in a storage may send a reply to a request even though the node is an intermediate node. Accordingly, an average transmission path length is shortened, while eliminating a need for a content to be retrieved from an original content owner, resulting in a reduction of a total amount of network usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of caching a content in a node in a content-centric network, includes receiving, from a content requester, a content request packet requesting a first chunk of the content, and setting a mark bit indicating whether the node is to cache the first chunk when the first chunk is received. The method further includes receiving, from a content provider, a data packet including the first chunk in response to transmitting the content request packet to the content provider, and caching the first chunk.

The method may further include generating another content request packet in which a booking bit is set, the booking bit requesting a next node to cache a second chunk of the content and successive to the first chunk, and transmitting the other content request packet to the next node.

In response to the other content request packet, the next node may be configured to set another mark bit in a pending interest table of the next node, the other mark bit indicating whether the next node is to cache the second chunk when the second chunk is received, and forward the other content request packet in which the booking bit is cleared.

The caching of the first chunk may include verifying whether the mark bit is set in a pending interest table of the node, and caching the first chunk in a content store of the node based on a result of the verifying.

The content request packet may include a hop count configured to be increased in response to the content request packet being relayed from the content requester, and content information.

The method may further include determining whether the node is adjacent to the content requester based on the hop count.

The content information may include a name of the content, or a size of the content, or a number of chunks constituting the content, or any combination thereof.

The method may further include receiving, from the content provider, meta information of chunks constituting the content.

A non-transitory computer-readable storage medium may store a program including instructions to cause a computer to perform the method.

In another general aspect, a method of caching a content in a node adjacent to a content provider in a content-centric network, includes receiving, from a content provider, a data packet including a first chunk of the content in response to transmitting, to the content provider, a content request packet requesting the first chunk, and caching a name of the first chunk. The method further includes caching the first chunk based on a request frequency of the first chunk.

The caching of the first chunk may include updating a count indicating the request frequency in response to receiving, from the content requester, another content request packet requesting the first chunk, determining whether the updated count is greater than or equal to a preset threshold, and caching the first chunk in a content store of the node based on a result of the determining.

The data packet may include a hop count configured to be increased in response to the data packet being relayed from the content provider.

The method may further include determining whether the node is adjacent to the content provider based on the hop count.

The method may further include forwarding the data packet to a next node.

The method may further include caching a name of a second chunk of the content and successive to the first chunk in a content store of the node in response to receiving, from the content provider, a data packet including the second chunk.

The method may further include generating another data packet in which a caching bit is set in response to the caching of the name of the second chunk, the caching bit notifying the next node that the node caches the first chunk, and forwarding, to the next node, the other data packet.

In response to the other data packet, the next node may be configured to cache the name of the first chunk in a content store of the next node, and forward the other data packet in which the caching bit is cleared.

In still another general aspect, a method of transmitting a content in a content provider in a content-centric network, includes selecting, based on a chunk popularity, a chunk from chunks constituting a portion of content requested from a content requester in response to receiving, from the content requester, a content request packet requesting the content, and transmitting a data packet including the selected chunk to a node adjacent to the content requester.

The content request packet may include a hop count configured to be increased in response to the content request packet being relayed from the content requester, and content information.

The transmitting may include transmitting the data packet to the node adjacent to the content requester based on the hop count.

The method may further include generating the data packet including the selected chunk and a caching bit notifying a node caching the selected chunk.

In yet another general aspect, an apparatus includes a processor configured to set a mark bit indicating whether the apparatus is to cache a first chunk of a content when the first chunk is received, in response to a content request packet requesting the first chunk being received, and forward the content request packet. The processor is further configured to cache the first chunk in response to the mark bit being set and a data packet including the first chunk being received.

The processor may be further configured to generate another content request packet in which a booking bit is set, the booking bit requesting a next node to cache a second chunk of the content and successive to the first chunk, and transmit the other content request packet to the next node.

Other features and aspects will be apparent from the following detailed description, the drawings, and the claims.

BRIEF DESCRIPTION OF THE DRAWINGS

FIG. 11 is a flowchart illustrating an example of a method of transmitting a content in a content provider in a CCN.

Figure 1:
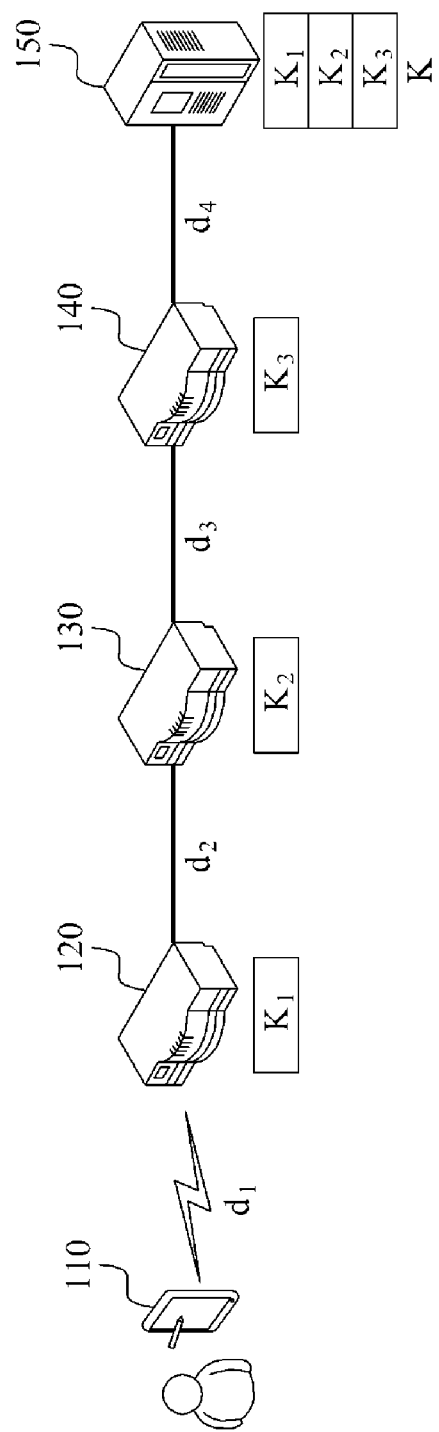
FIG. 1 is a diagram illustrating an example of a content request and providing a content in response thereto in a content-centric network (CCN) in the related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a content request and providing a content in response thereto in a content-centric network (CCN) in the related art. As used hereinafter, the term "content provider" may refer to a node or a router that originally owns or caches a content requested from a "content requester", and the term "content requester" may refer to a node or a router that requests a content. The term "intermediate node" may refer to any other node that is not the content provider and the content requester included in the CCN, and may be understood to include a network device, such as, for example, a mobile terminal and a content router. However, in various examples, the content provider and the content requester may be used as an intermediate node.

Referring to FIG. 1, a user terminal that is a content requester 110 transmits a content request packet requesting a content, called an "interest", over a network, and a content server that is a content provider 150 transmits a data packet including the content in response to the content request packet. The content K included in the data packet includes a plurality of segments $K_1$ through $K_3$ constituting the content or a file, and the respective segments are cached in intermediate nodes 120, 130, and 140 on a transfer path of the content in the CCN, which includes communication links $d_1$ through $d_4$.

When the content provider 150 transmits the content in response to the received content request packet, each of the intermediate nodes 120, 130, and 140 forwards the content to a location from which the content request packet is received, for example, a face. In this example, each of the intermediate nodes 120, 130, and 140 may also temporarily store the content in a storage space, for example, a content store 210 of FIG. 2. Each of the intermediate nodes 120, 130, and 140 on the transfer path may cache the content.

When the content provider 150 stores or caches a variety of contents, and a plurality of content requesters transmits content request packets, the variety of contents may be stored or cached in the intermediate nodes 120, 130, and 140 on a network path. When the content requesters request the variety of contents, a large amount of contents may be stored in the intermediate nodes 120, 130, and 140, and new content may be stored. Hereinafter, the terms "store" and "cache" may be interchangeably used throughout.

Figure 2:
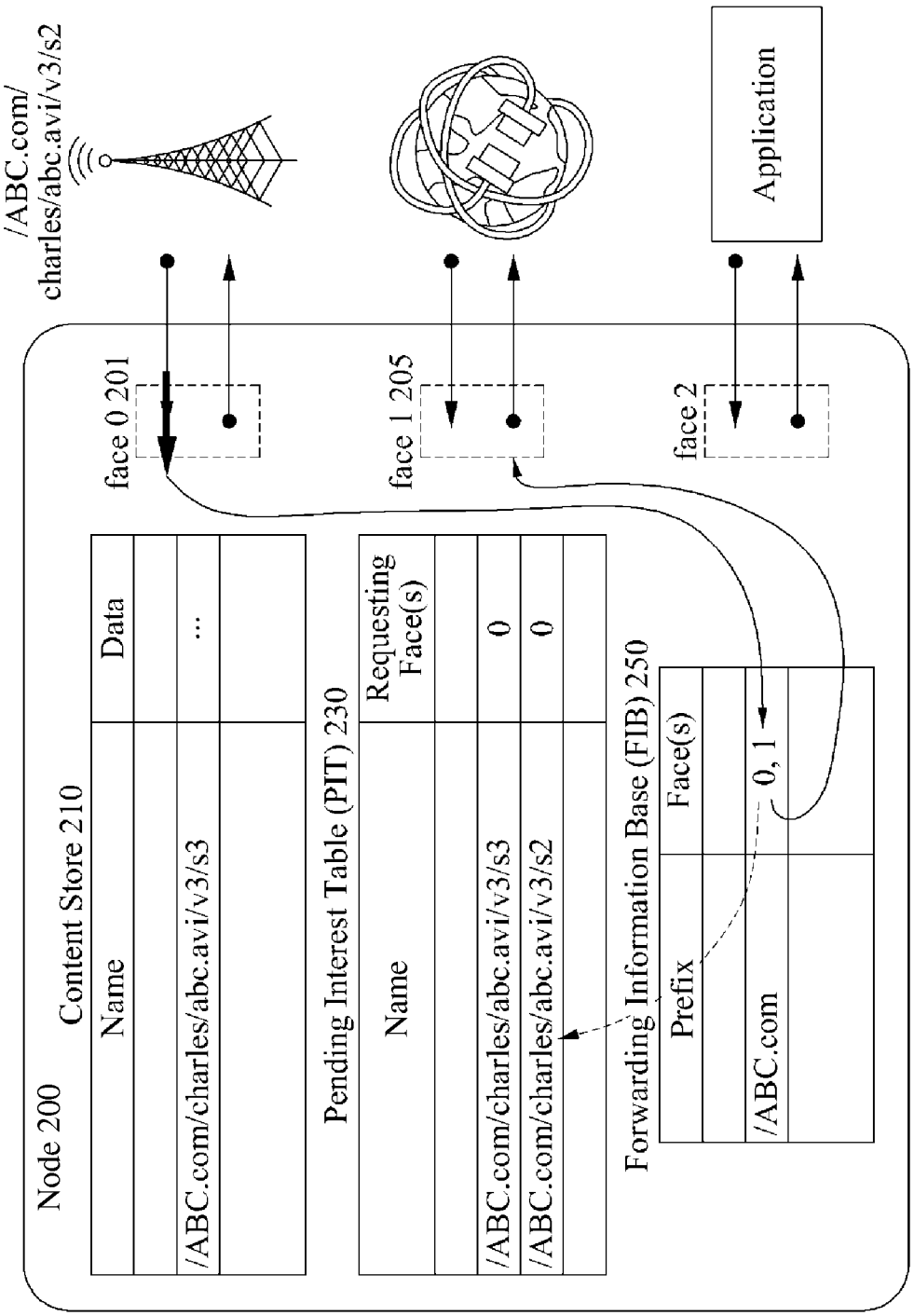
FIG. 2 is a diagram illustrating an example of processing a content request packet at each node in the CCN of FIG. 1.

FIG. 2 is a diagram illustrating an example of processing a content request packet at each node in the CCN of FIG. 1. In the CCN or a name-based network, a name of a content may perform a compass function to locate a node in which the content is stored, and may be used to identify the content. Accordingly, each content has a unique name. Two contents having different names may be recognized to be different contents although the two contents are identical. For example, when contents of two files are identical but have different content names of "/ABC.com/sait/video/intro.avi" and "/ABC.com/sait/comm/video/intro.avi", respectively, the contents of the files may be recognized to be different. The preceding rule may be useful for distinguishing different contents having similar content names. Hereinafter, processing of a content request packet to retrieve a corresponding content based on a hierarchical name of the content in the CCN is described.

For example, when an CCN node 200 receives a content request packet that requests a content with a hierarchical name "/ABC.com/charles/abc.avi/v3/s2" from a face 0 201, a networking module of the node 200 determines whether the content is present in a content store (CS) 210 or content cache of the node 200 based on the hierarchical name of the content, "/ABC.com/charles/abc.avi/v3/s2". The face may be expressed as an interface. The CS 210 may be also termed a contents cache.

When the content is determined to be present in the CS 210, the node 200 transmits the content to the face 0 201 from which the content request packet is received. When the content is determined to be absent in the CS 210, the node 200 determines whether an entry stored with the same content name "/ABC.com/charles/abc.avi/v3/s2" is present in a pending interest table (PIT) 230 of the node 200.

When the entry stored with the same content name is present in the PIT 230, the node 200 adds information of a face from which the content request packet is received, in this example, the face 0 201, to the corresponding entry in the PIT 230. When the entry stored with the same content name is absent in the PIT 230, the node 200 looks up an entry stored with the same prefix (e.g., "/ABC.com") of the content name "/ABC.com/charles/abc.avi/v3/s2" in a forwarding information base (FIB) 250. In this example, the node 200 may use a longest prefix matching when conducting a search for the entry.

When the entry stored with the same prefix is found in the FIB 250, node 200 determines a face to which the content request packet is to be forwarded, for example, a face 1 205, based on information registered in the found entry in the FIB 250, and forwards the content request packet to the determined face 1 205. Also, the node 200 registers, in the corresponding entry in PIT 230, the information of the face 0 201 from which the content request packet is received. The registration is performed to forward a data packet including the content requested by the content request packet to a node requesting the content when the data packet is received. Accordingly, the face from which the content request packet is received, in this example, the face 0 201, is excluded from the determining of a face to which the content request packet is to be forwarded based on the FIB 250.

Figure 3:
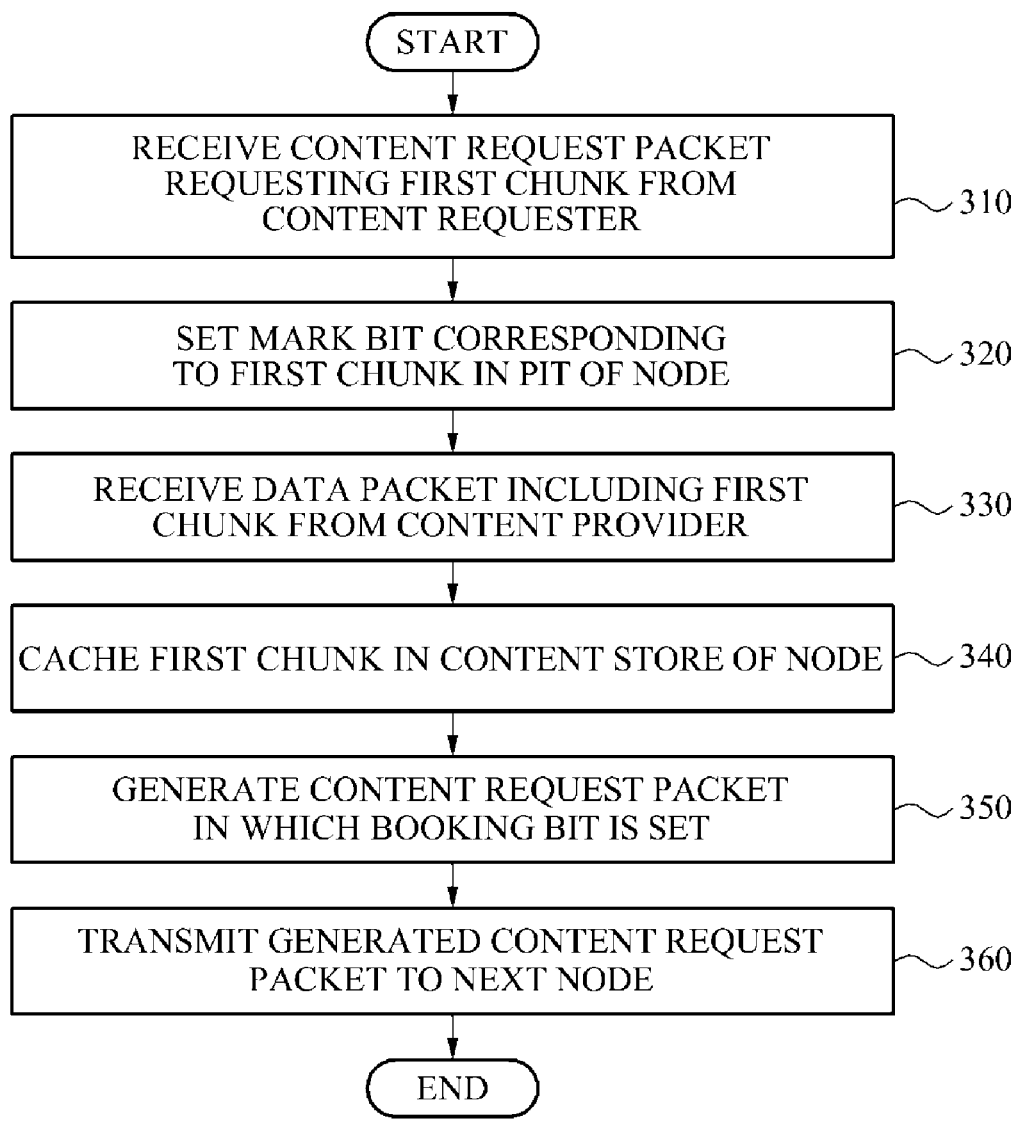
FIG. 3 is a flowchart illustrating an example of a method of caching a content in a node in a CCN.

FIG. 3 is a flowchart illustrating an example of a method of caching a content in a node in a CCN. Hereinafter, the term "next node" used in FIGS. 3 through 6 may be understood to be a node adjacent to a content provider rather than a corresponding node.

Referring to FIG. 3, in operation 310, a node receives a content request packet requesting a first chunk from a content requester. The chunk indicates a set of segments constituting one content or file. The content may be configured to be a chunk block including a plurality of chunks. In one example, prior to operation 310, the node or the content requester may receive, from the content provider, meta information of chunks constituting the content, and may verify a presence of a chunk including desired segments of the content, based on the received meta information.

The content request packet may include a hop count increasing in response to the content request packet being relayed from the content requester, and content information. Accordingly, the node may determine whether the node is adjacent to the content requester based on the hop count, for example, a value of the hop count. For example, according to an increase in a value of the hop count, the node may determine that the node is located away from the content requester. According to a decrease in a value of the hop count, the node may determine that the node is adjacent to the content requester. The content information may include a name of the content, a size of the content, and/or a number of the chunks constituting the content. The number of the chunks constituting the content may be determined based on a transfer bitrate of a user link via which the content is to be transmitted, and a playing bitrate of the content.

In operation 320, the node sets a mark bit corresponding to the first chunk in a PIT of the node. The mark bit may indicate whether the node is to cache the first chunk in a content store of the node when the first chunk is received.

In operation 330, the node receives a data packet including the first chunk from the content provider in response to transmitting the content request packet.

In operation 340, the node caches the first chunk in the content store of the node. A method of caching the first chunk in the node is described with reference to FIG. 4.

In operation 350, the node generates a content request packet in which a booking bit is set. The booking bit may request a next node to cache a second chunk successive to the first chunk. For example, when the booking bit is set as "1", it may request the next node to cache the second chunk. When the booking bit is set as "0", it may request the next node not to cache the second chunk.

In operation 360, the node transmits the generated content request packet to the next node. In response to receiving the content request packet in which the booking bit is set, the next node may set a mark bit corresponding to the second chunk in a PIT of the next node, and may forward, to the content provider, a content packet request in which the booking bit is cleared.

Figure 4:
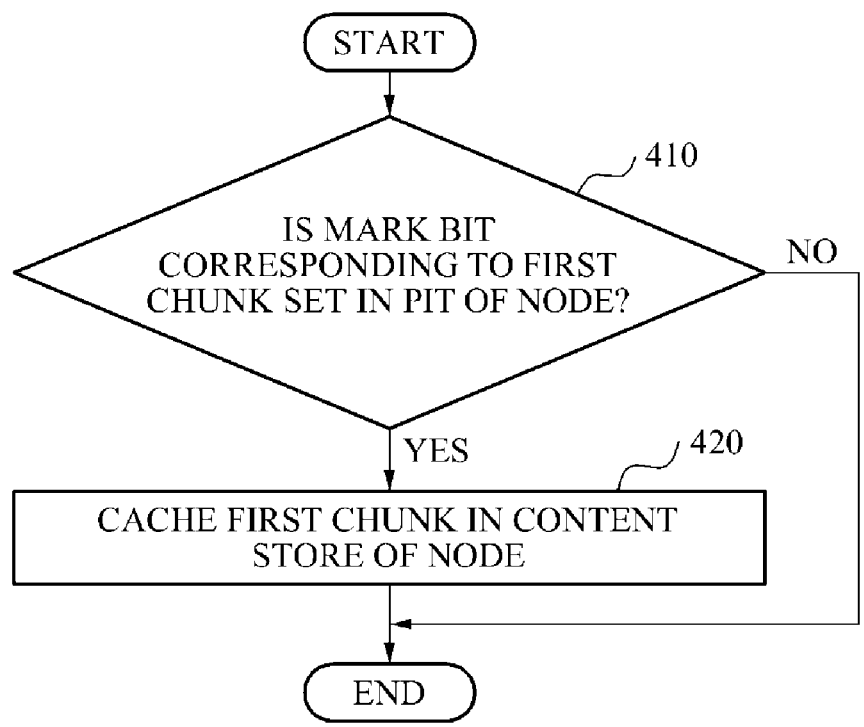
FIG. 4 is a flowchart illustrating an example of a method of caching a first chunk in the node in the example of FIG. 3.

FIG. 4 is a flowchart illustrating an example of a method of caching the first chunk in the node in the example of FIG. 3. Referring to FIG. 4, in operation 410, the node verifies whether the mark bit corresponding to the first chunk is set in the PIT of the node after receiving the data packet including the first chunk. When the mark bit corresponding to the first chunk is verified to be not set in the PIT of the node, the node does not cache the first chunk, and terminates the method. Otherwise, the method continues in operation 420.

In operation 420, the node caches the first chunk in the content store of the node.

Figure 5:
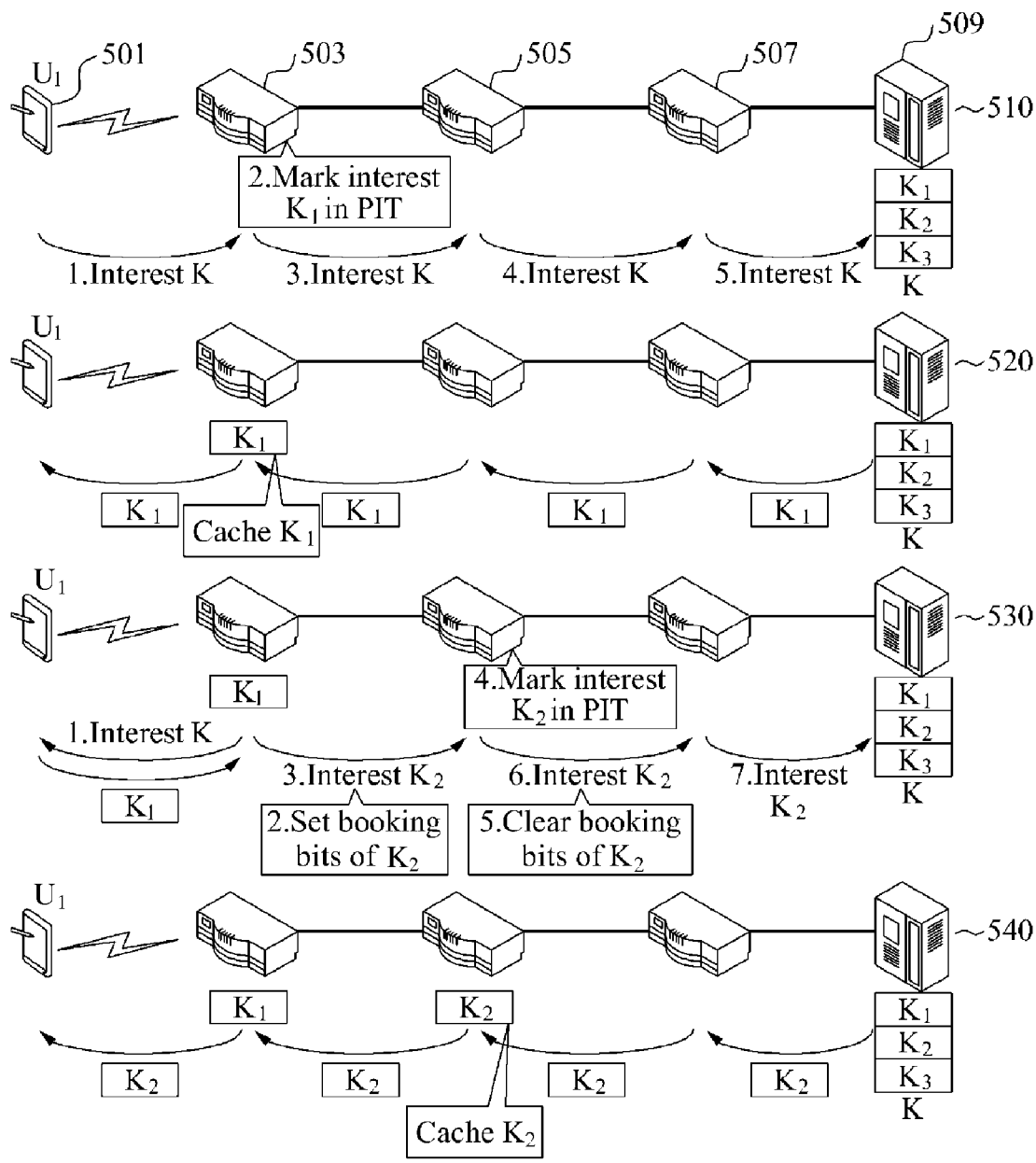
FIG. 5 is a diagram illustrating an example of a process of performing a method of caching a content in a node in a CCN.

FIG. 5 is a diagram illustrating an example of a process of performing a method of caching a content in a node in a CCN. In one example, a content provider may divide one content or file into chunks, each of which includes the same number of segments. The content provider or the node may cache a most popular content or chunk, for example, a multimedia forehead, in a content store of a node adjacent to a content requester. The node adjacent to the content requester may be referred to as an edge node. The node may gradually construct a cache pipeline from the node adjacent to the content requester to the content provider based on a request frequency of the content.

Referring to FIG. 5, in operation 510, a node 503 adjacent to a user terminal 501 $U_1$ requesting a content receives a content request packet, named an interest, requesting content K or chunk $K_1$ from the user terminal 501, and forwards the received content request packet to a content server 509 providing contents via nodes 505 and 507. The node 503 sets a mark bit corresponding to the chunk $K_1$ in a PIT of the node 503. The mark bit indicates whether the node 503 is to cache the chunk $K_1$ in a content store of the node 503 when the node 503 receives the chunk $K_1$.

In operation 520, the content server 509 transmits the chunk $K_1$ to the user terminal 501 via the nodes 503 through 507 in response to the content request packet of operation 510. The node 503 caches the chunk $K_1$ in the content store of the node 503.

In operation 530, the node 503 receives a content request packet requesting chunk K2 successive to the chunk K1 from the user terminal 501. The node 503 generates a content request packet in which a booking bit requesting a next node, for example, the node 505, to cache the chunk K2 is set. The node 503 transmits the generated content request packet to the content server 509 via the nodes 505 and 507. In response to receiving the interest in which the booking bit is set, the next node 505 sets a mark bit corresponding to the chunk K2 in a PIT of the next node 505. The next node 505 forwards, to the node 507, the generated content request packet in which the booking bit corresponding to the chunk K2 is cleared.

In operation 540, the content server 509 transmits the chunk $K_2$ to the user terminal 501 via the nodes 503 through 507 in response to the content request packet requesting the chunk $K_2$. The node 505 caches the chunk $K_2$ in a content store of the node 505.

In the following, algorithm 1 expresses a method of processing, by a node, an interest in a pseudo code form, and algorithm 2 expresses a method of processing, by a node, chunk in a pseudo code form. Also, algorithm 3 expresses a method of caching, by a node, a chunk in a content cache in a pseudo code form.

| Algorithm 1. Interest processing algorithm for cache replication |
|---|
| 1    m: number of chunks a block of file F |
| 2    $n_i$: hop count of interest i from the user |
| 3 |
| 4    On receiving interest i for i-th chunk of file F: |
| 5    if i-th chunk of F is cached |
| 6      access the cache and return the chunk; |
| 7      exit; |
| 8    END |
| 9    if $n_i == 1$    // edge router |
| 10     if i <= m    //forehead block |
| 11      set the booking bit of interest i; |
| 12      put interest i into PIT with its n and booking bit values; |
| 13     else if   1 through $\lfloor (i-1)/m \rfloor \times m$ - th chunks are cached |
| 14      set the booking bit of interest i; |
| 15    END |
| 16    else |

| Algorithm 1. Interest processing algorithm for cache replication |
|---|
| 17    if (booking bit is set) |
| 18     if $\lceil i/m \rceil == n$ |
| 19      put interest i into PIT with its n and booking bit values; |
| 20      clear the booking bit of interest i; |
| 21     END |
| 22     else if $^{(i > n \times m)\ \&\ \&(((n-1)\times m + 1) through \lfloor (i-1)/m \rfloor \times m\ -\ th\ chunks\ are\ cached)}$ |
| 23      set the booking bit of interest i ; |
| 24     END |
| 25    END |
| 26    forward interest i to the next router; |

| Algorithm 2. Data processing algorithm for cache replication |
|---|
| 1    $n_i$ : hop count value of interest i stored PIT |
| 2 |
| 3    On receiving data chunk i for i-th chunk of file F: |
| 4    if interest i in PIT |
| 5     if interest i's is marked to cache |
| 6      if (i <= m) |
| 7       call the Caching_Procedure(i, 0); |
| 8      else |
| 9       call the Caching_Procedure(i, 1); |
| 10    END |
| 11    forward chunk i; |
| 12    END |

| Algorithm 3. Caching_Procedure (i, c ) |
|---|
| 1    i: sequence number of the chunk of file F |
| 2    c: entered caching count |
| 3    cache_$cnt_i$: current caching count of chunk i in name table |
| 4    if chunk i is not cached |
| 5     if c == 0 |
| 6      cache chunk i; |
| 7      remove chunk i in name table if it exists; |
| 8     else if chunk i is in name table |
| 9      cache_$cnt_i$ = cache_$cnt_i$-1; |
| 10     if cache_$cnt_i$ <=0 |
| 11      cache chunk i; |
| 12      remove chunk i in name table; |
| 13     END |
| 14    else |
| 15     put chunk i into name table; |
| 16     cache_$cnt_i$ = c; |
| 17    END |
| 18    END |

Examples of an operation of a node are arranged as follows. When a data packet including a sequence number i is received, information of a corresponding chunk is present in a PIN of the node, and a mark bit corresponding to the chunk is set in a PIT of the node, the node caches the chunk in a content store of the node.

When an interest requesting a chunk corresponding to a sequence number i is received from a corresponding node, and the received interest corresponds to the following examples, the node sets a mark bit in a PIT of the node:

An example in which the corresponding node is an edge node or an edge router adjacent to a content requester requesting content, and i<=m, where m denotes a number of chunks included in a block of content or file F;

An example in which the corresponding node is an edge node, i>m, and all of the chunks from a current first chunk to $\lfloor (i-1)/m \rfloor \times m$-th chunk are cached in a content store of the node;

An example in which the corresponding node is not an edge node, a booking bit of the received interest is set as "1", and $\lceil i/m \rceil = n_i$; and An example in which the corresponding node is not an edge node, the booking bit of the received interest is set as "0", (i>n×m), and all of the chunks from current ((n−1)× m+1)-th chunk to $\lfloor (i-1)/m \rfloor \times m$-th chunk are cached, where $n_i$ or n denotes a hop count of interest i transmitted from a user terminal.

Figure 6:
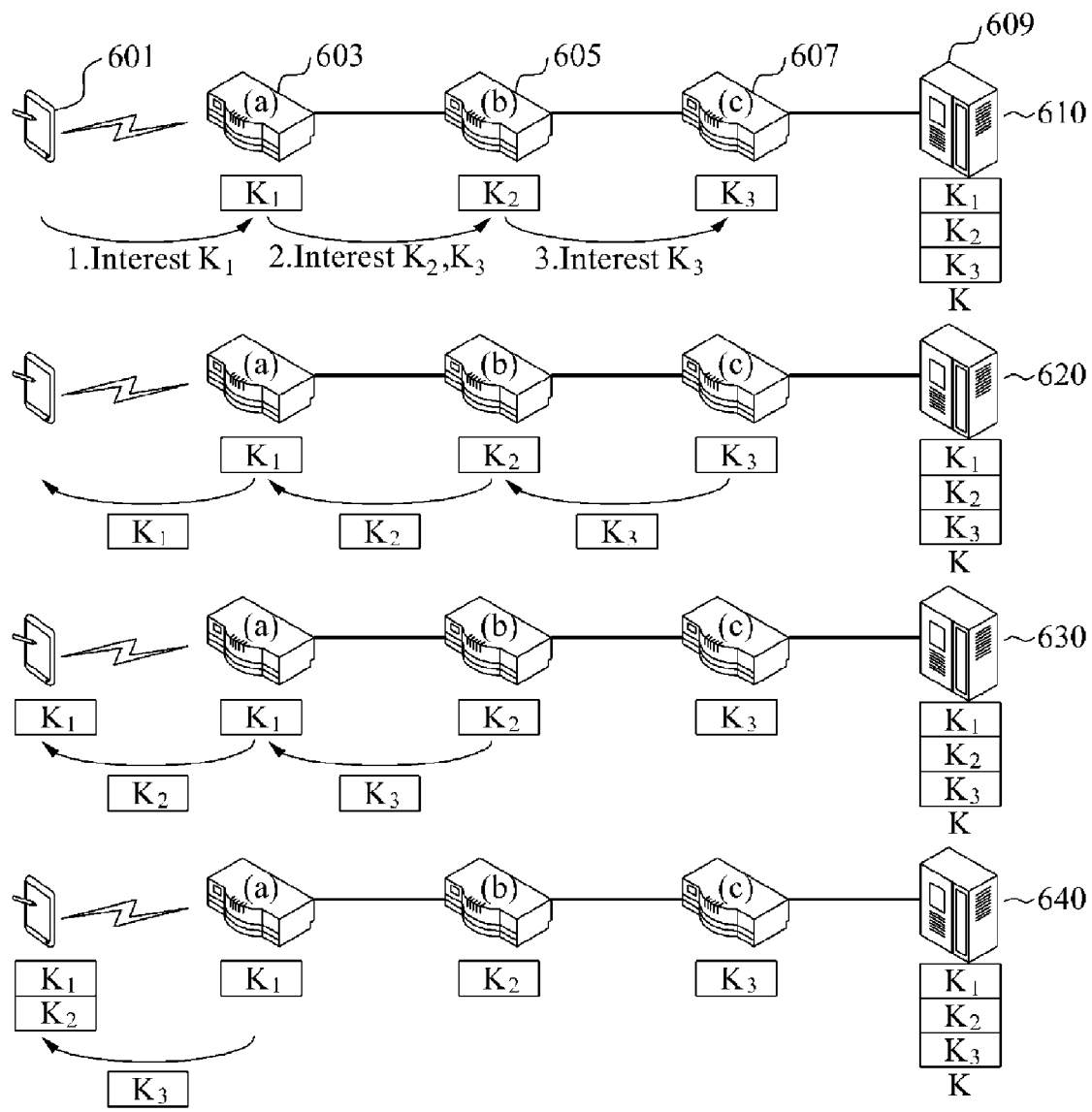
FIG. 6 is a diagram illustrating an example of an effect of a pipelined cache access achieved when performing the method of FIG. 5.

FIG. 6 is a diagram illustrating an example of an effect of a pipelined cache access achieved when performing the method of FIG. 5. By accessing a cache in a pipeline form of FIG. 5, a delay to be detected by a user decreases in practice as illustrated in FIG. 6.

Referring to FIG. 6, when a content server 609 providing contents caches content or file K including three chunks $K_1$ through $K_3$, and an end router a 603 has already cached $K_1$, in operation 610, a user terminal 601 transmits an interest requesting the content K to the end router a 603 corresponding to an edge node. The end router a 603 has already cached the chunk $K_1$ in a content store of the end router a 603, and thus, transmits interests requesting the chunks $K_2$ and $K_3$ to a next node, such as, for example, a router b 605. When the interests requesting the chunks $K_2$ and $K_3$ are received, the router b 605 transmits an interest requesting the chunk $K_3$ to a router c 607 because the chunk $K_2$ is already cached in a content store of the router b 605.

In operation 620, while transmitting the interests requesting the chunks $K_2$ and $K_3$ to the router b 605 and/or receiving the chunk $K_2$ from the router b 605, the end router a 603 transmits the chunk $K_1$ to the user terminal 601. While transmitting the interest requesting the chunk $K_3$ to the router c 607 and/or receiving the chunk $K_3$ from the router c 607, the router b 605 transmits the chunk $K_2$ to the end router a 603. In response to receiving the interest requesting the chunk $K_3$ from the router b 605, the router c 607 transmits the chunk $K_3$ to the router b 605 since the chunk $K_3$ is already cached in a content store of the router c 607

In operation 630, while receiving the chunk $K_3$ from the router b 605, the end router a 603 transmits the chunk $K_2$ to the user terminal 601. In response to receiving the chunk $K_3$ from the router c 607, the router b 605 transmits the chunk $K_3$ to the end router a 603.

In operation 640, in response to receiving the chunk $K_3$ from the router b 605, the end router a 603 transmits the chunk $K_3$ to the user terminal 601. Such a pipelined cache access is suspended when the user terminal 601 completely downloads the content K through operations 620 and 640.

A bandwidth between the user terminal 601 and the end router a 603 is smaller than a bandwidth between the user terminal 601 and the router c 607 corresponding to a core router, and thus, the user may not recognize a delay occurring after a start-up latency occurs in an example of a start. The core router may be understood as a router adjacent to the content server 609 or a content provider providing contents.

In a streaming service, the user may play a content while downloading the content. When a playing time of a content or a file is greater than a downloading time, a pipelined cache access method may more effectively decrease a transmission delay perceived by the user.

Figure 7:
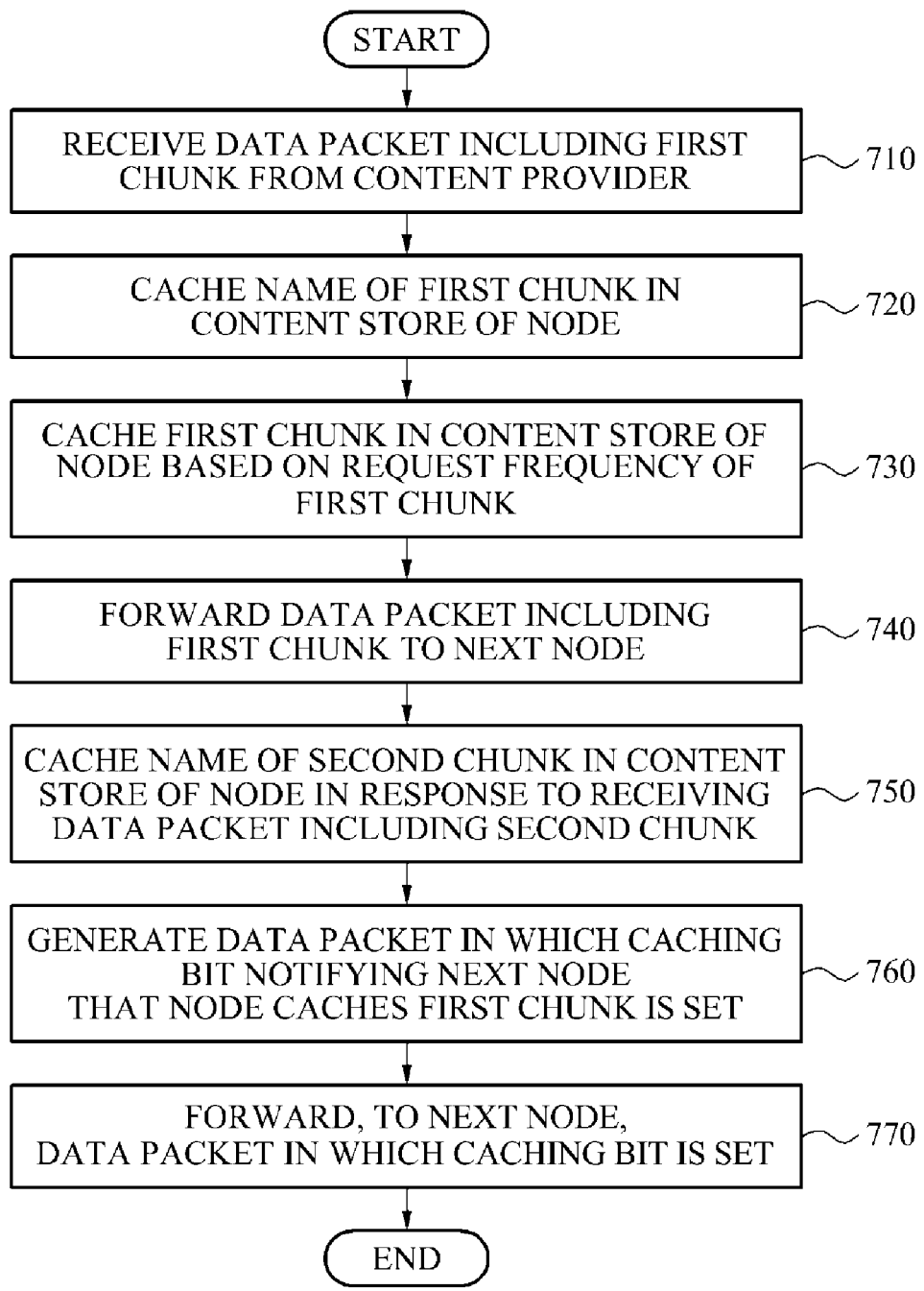
FIG. 7 is a flowchart illustrating another example of caching a content in a node in a CCN.

FIG. 7 is a flowchart illustrating another example of caching a content in a node in a CCN. Hereinafter, the term "next node" used in FIGS. 7 through 10 may be understood to be a node adjacent to a content requester rather than the node.

Referring to FIG. 7, in operation 710, a node receives a data packet including a first chunk from a content provider, which transmits the data packet in response to the content provider receiving a content request packet requesting a content including the first chunk. The data packet may include a hop count increasing in response to the data packet being relayed from the content provider. Accordingly, the node determines whether the node is adjacent to the content provider based on a value of the hop count.

In operation 720, the node caches a name of the first chunk in a content store of the node.

In operation 730, the node caches the first chunk in the content store of the node based on a request frequency of the first chunk. An example of a method of caching the first chunk in the node based on the request frequency is described with reference to FIG. 8.

In operation 740, the node forwards the data packet including the first chunk to a next node. The next node may be understood to be adjacent to the content requester rather than the node.

In operation 750, the node caches a name of a second chunk successive to the first chunk in the content store of the node in response to receiving a data packet including the second chunk.

In operation 760, the node generates a data packet in which a caching bit notifying the next node that the node caches the first chunk is set. The caching bit is included in the data packet or a data chunk.

In operation 770, the node forwards, to the next node, the data packet in which the caching bit is set. In response to receiving the data packet in which the caching bit is set, the next node caches the name of the first chunk in a content store of the next node, and forwards, to a content requester, a data packet in which the caching bit is cleared.

Figure 8:
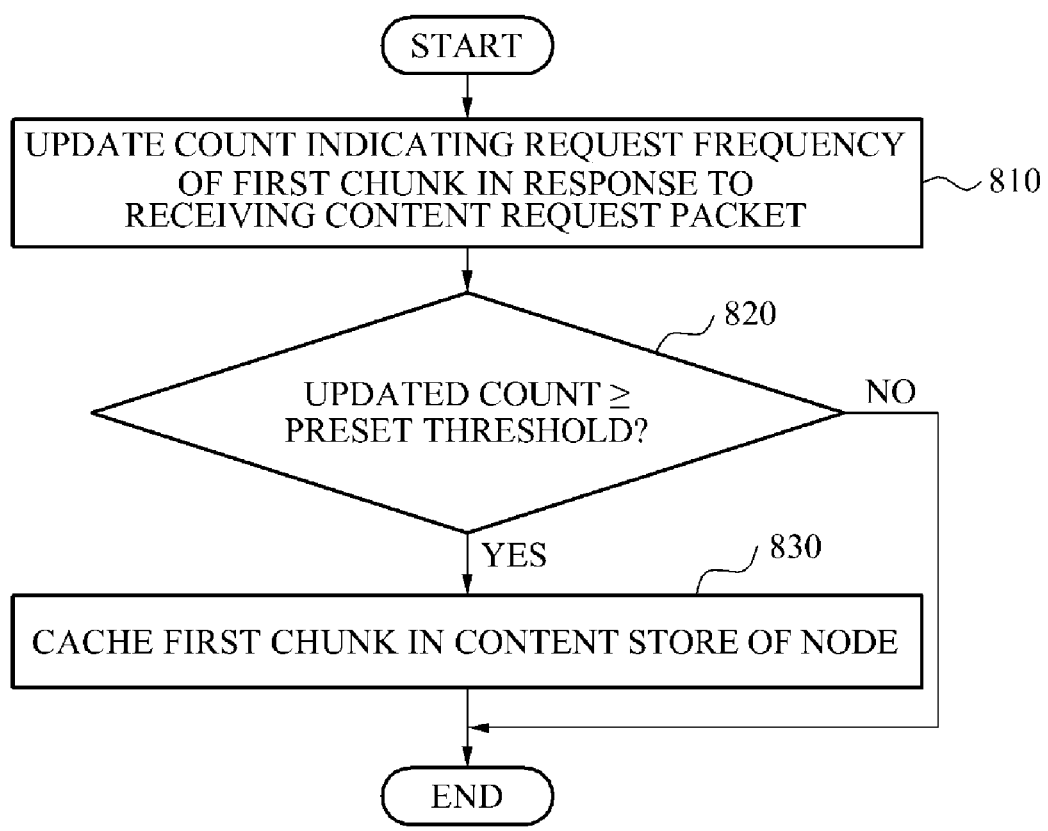
FIG. 8 is a flowchart illustrating another example of a method of caching a first chunk in the node in the example of FIG. 7.

FIG. 8 is a flowchart illustrating another example of a method of caching the first chunk in the node in the example of FIG. 7. Referring to FIG. 8, in operation 810, the node updates a count indicating the request frequency of the first chunk in response to the node receiving the content request packet requesting the first chunk after caching the name of the first chunk in operation 720.

In operation 820, the node determines whether the updated count is greater than or equal to a preset threshold. When the updated count is determined to be greater than or equal to the preset threshold, the method continues in operation 830. Otherwise, the node does not cache the first chunk in the content store, and terminates the method.

In operation 830, the node caches the first chunk in the content store of the node.

Figure 9:
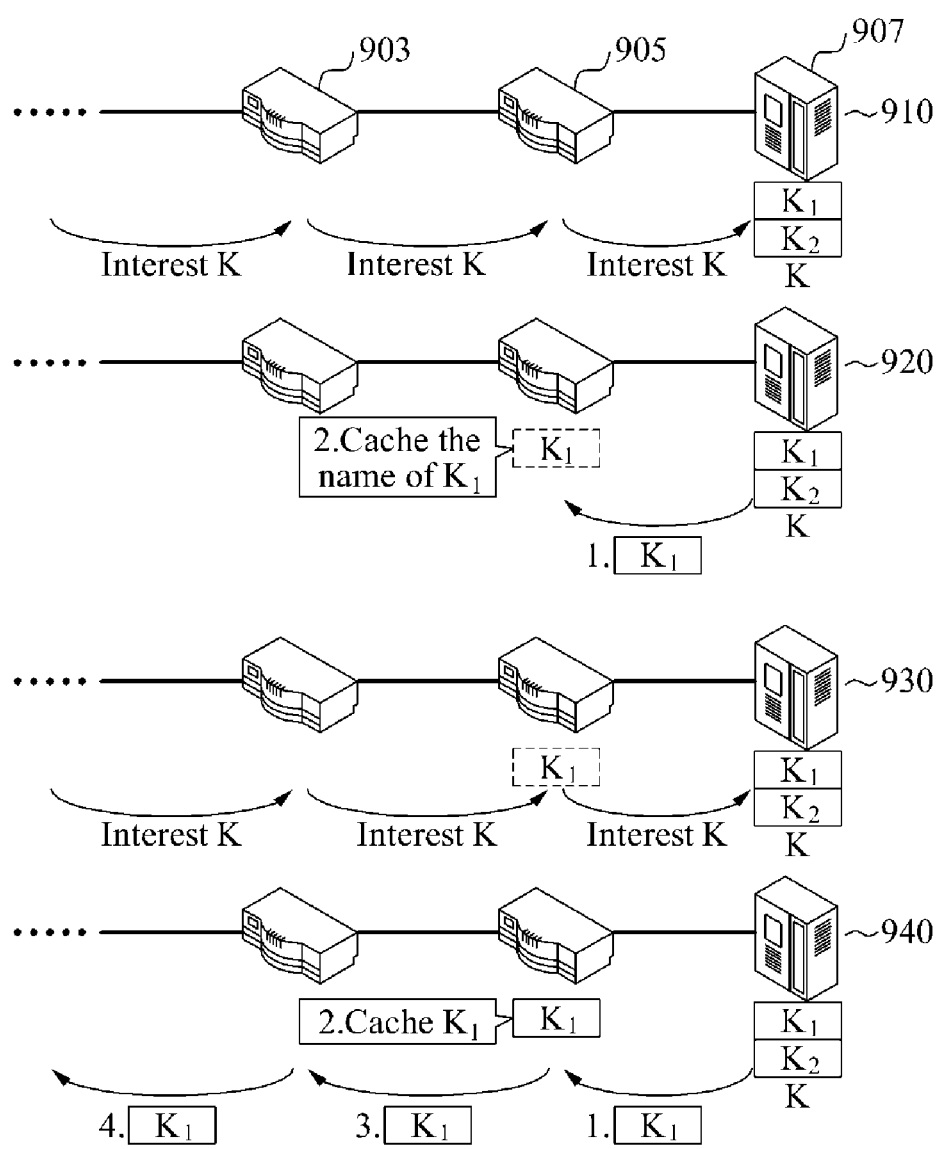
FIGS. 9 and 10 are diagrams illustrating another example of a process of performing a method of caching a content in a node in a CCN.
Figure 10:
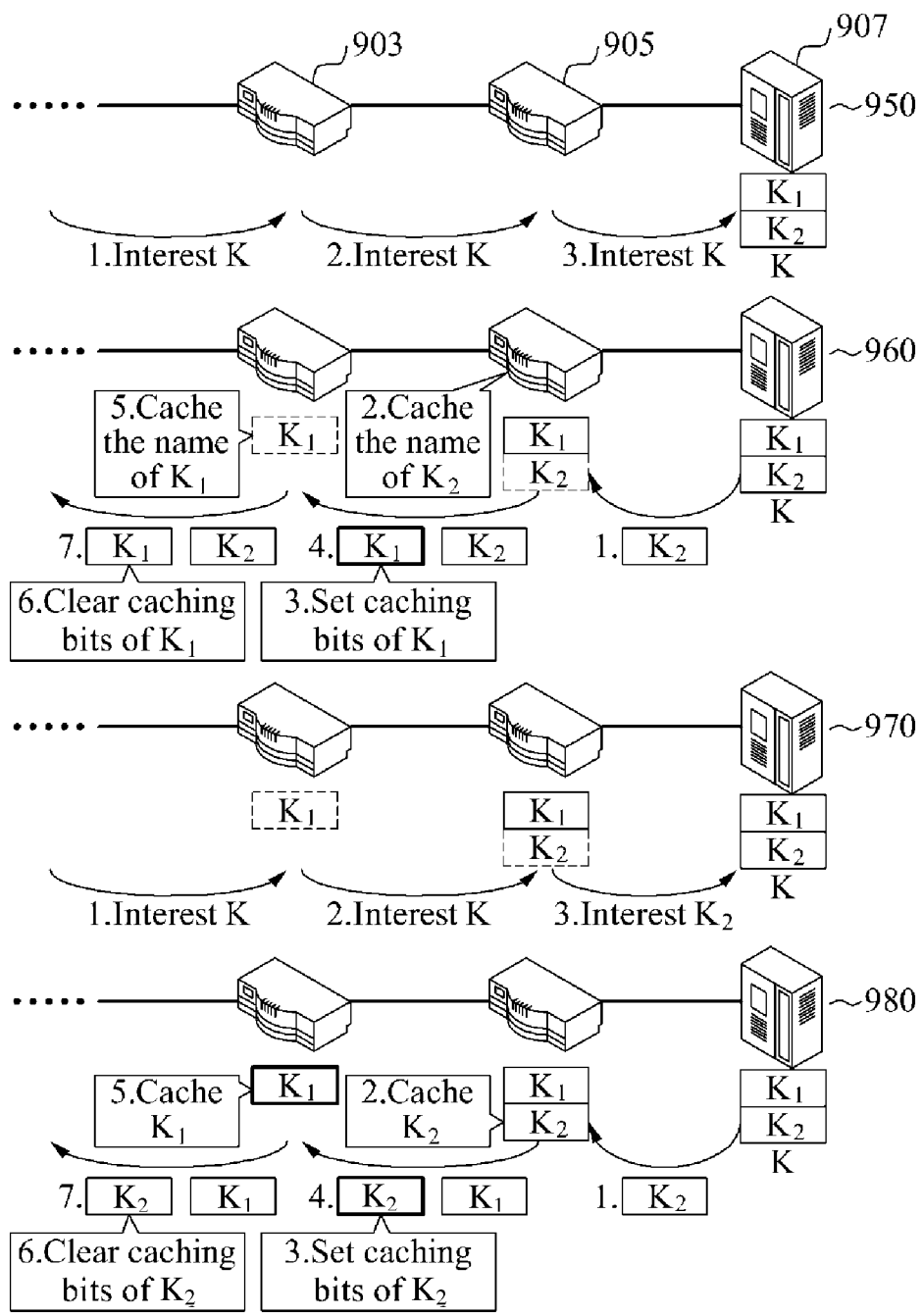

FIGS. 9 and 10 are diagrams illustrating another example of a process of performing a method of caching a content in a node in a CCN. A dashed line around an outside of a corresponding chunk at each node of FIGS. 9 and 10, indicates that a name of the chunk is cached, and a bold line around an outside of a corresponding chunk indicates that a caching bit is set for the chunk.

Referring to FIGS. 9 and 10, in operation 910, a node 905 forwards, to a content provider 907, a content request packet, named an interest, transferred from a content requester via a node 903. The content request packet requests a content K including chunks $K_1$ and $K_2$.

In operation 920, the node 905 receives a data packet including the chunk $K_1$ from the content provider 907, which transmits the data packet in response to the content request packet. The node 905 is adjacent to the content provider 907, and caches a name of the chunk $K_1$ in a content store of the node 905. The node 905 sets a count indicating a request frequency of the chunk $K_1$ to, for example, "0" or "1".

In operation 930, in response to receiving another interest requesting the content K, for example, the chunk $K_1$, from the content requester via the node 903, the node 905 updates the count indicating the request frequency of the chunk $K_1$. The node 905 forwards the other interest to the content provider 907.

In operation 940, the node 905 receives a data packet including the chunk $K_1$ from the content provider 907, which transmits the data packet in response to the interest. When the updated count is greater than or equal to a preset threshold, the node 905 caches the chunk $K_1$ in the content store of the node 905, and forwards the data packet including the chunk $K_1$ to the content requester via the node 903.

In operation 950, an interest requesting the content K, for example, the chunk $K_2$ successive to the chunk $K_1$ is transmitted from the content requester to the content provider 907 via the nodes 903 and 905.

In operation 960, the content provider 907 transmits a data packet including the chunk $K_2$ to the node 905. In response to receiving the chunk $K_2$, the node 905 caches a name of the chunk $K_2$ in the content store of the node 905. The node 905 forwards, to the node 903 corresponding to a next node, a data packet in which a caching bit notifying that the node 905 caches the chunk $K_1$ is set. In response to receiving the data packet in which the caching bit notifying that the node 905 caches the chunk $K_1$ is set, the node 903 caches the name of the chunk $K_1$ in a content store of the node 903, and clears the caching bit notifying that the node 905 caches the chunk $K_1$. The node 903 forwards, to the content requester, the data packet in which the caching bit notifying that the node 905 caches the chunk $K_1$ is cleared.

In operation 970, the interest requesting the content K is continuously transmitted from the content requester to the content provider 907 via the nodes 903 and 905.

In operation 980, the content provider 907 transmits a data packet including the chunk $K_2$ to the node 905. In response to receiving the chunk $K_2$, the node 905 caches the chunk $K_2$ in the content store of the node 905. The node 905 forwards, to the node 903 corresponding to the next node, a data packet in which a caching bit notifying that the node 905 caches the chunk $K_2$ is set. In response to receiving the data packet in which the caching bit notifying that the node 905 caches the chunk $K_2$ is set, the node 903 caches the chunk $K_1$ in the content store of the node 903, and clears the caching bit notifying that the node 905 caches the chunk $K_2$. The node 903 forwards, to the content requester, the data packet in which the caching bit notifying that the node 905 caches the chunk $K_2$ is cleared.

The following algorithm 4 and algorithm 5 express a method of processing, by a node using the method of FIGS. 9 and 10, an interest and a chunk or data in a pseudo code form.

---

Algorithm 4. Data processing algorithm for cache propagation from the source

```
1   m: number of chunks file F to be cached at a time as a block
2   n_i: hop count of i-th chunk of file F from the source
3   C: predefined threshold count value to cache a chunk (default is 1)
4
5   On receiving i-th chunk of file F:
6   if interest for i-th chunk of F is not in PIT || chunk i is cached
7       ignore and exit;
8   END
9
```

-continued

Algorithm 4. Data processing algorithm for cache propagation from the source

```
10  if n==1 || caching bit is set
11      if (1 through max{⌊(i − 1)/m⌋×m, m} -th chunks are cached)
            ||( i<=m)
12          Caching_Procedure(i, C);
13      END
14      clear the caching bit;
15  END
16  Forward chunk i to the next router;
```

Algorithm 5. interest processing algorithm for cache propagation from the source

```
1   m: the number of chunks of one block of file F
2
3   On receiving interest for i-th chunk of file F:
4   if i-th chunk of F is cached
5       if caching bit of the cached chunk is set
6           if 1 through min{⌊i/m⌋×m, sizeof(F)} -th chunks are cached
7               set the caching bit of the cached chunk;
8           else
8               clear the caching bit of the cached chunk;
9           END
10          access the cache and return the chunk;
11      END
12  else
13      Run the router's own interest management procedures;
14      Forward chunk i to the next router;
15  END
```

Examples of an operation of a node are arranged as follows. In response to receiving data or a chunk, the node caches a name of the chunk in a name table of a content store of the node 1) in an example in which a caching bit of the chunk is set as "1" and i<=m, or all of chunks from a first chunk to a max{⌊(i−1)/m⌋×m,m}-th chunk are cached in the content store of the node, or 2) in an example in which the node is a core node adjacent to a content provider and i<=m, or all of the chunks from the first chunk to the max{⌊(i−1)/m⌋×m,m}-th chunk are cached in the content store of the node. When the name of the chunk is already present in the name table, the node caches actual data, for example, the chunk in the content store of the node.

Depending on examples, an interest may be processed as expressed by the following algorithm 6, and a chunk may be processed as expressed by the following algorithm 7.

Algorithm 6. Interest processing algorithm for cache replication

```
1   m: number of chunks a block of file F
2   n_i: hop count of interest i from the user
3
4   On receiving interest i for i-th chunk of file F:
5   if i-th chunk of F is cached
6       if caching bit of the cached chunk is set
7           if 1 through min{⌊i/m⌋×m, sizeof(F)} -th chunks are cached
8               set the caching bit of the cached chunk;
9           else
10              clear the caching bit of the cached chunk;
11          END
12          access the cache and return the chunk;
13      END
14  else if n == 1   // edge router
15      if i <= m    // forehead block
16          put interest i into PIT with its n and booking bit values;
17      else if 1 through ⌊(i − 1)/m⌋×m - th chunks are cached
18          set the booking bit of interest i;
```

| Algorithm 6. Interest processing algorithm for cache replication |
| --- |
| 19        END |
| 20    else |
| 21        if (booking bit is set) |
| 22            if $^{[i/m]--\ n}$ |
| 23                put interest i into PIT with its n and booking bit values; |
| 24                clear the booking bit of interest i; |
| 25            END |
| 26        else |
|             if $^{(i\ >\ n \times m)\ \&\ \&(((n\ -\ 1) \times m\ +\ 1) through\ \lfloor (i\ -\ 1)/m \rfloor \times m\ -\ th\ chunks\ are\ cached)}$ |
| 27                set the booking bit of interest i ; |
| 28            END |
| 29    END |
| 30    forward interest i to the next router; |

| Algorithm 7. Data processing algorithm for cache propagation from the source |
| --- |
| 1      m: number of chunks file F to be cached at a time as a block |
| 2      $n_i$: hop count of interest i from the source |
|        3   C: predefined threshold count value to cache a chunk (default is 1) |
| 3 |
| 4      On receiving i-th chunk of file F: |
| 5      if interest for i-th chunk of F is not in PIT |
| 6          ignore and exit; |
| 7      END |
| 8      if (n==1 \|\| caching bit is set) |
| 9          if (1 through $^{max\{\lfloor (i\ -\ 1)/m \rfloor \times m,\ m\}}$-th chunks are cached) \|\|( i<=m) |
| 10              Caching_Procedure(i, C); |
| 11         END |
| 12         clear the caching bit; |
| 13      END |
| 14      if interest i is marked to cache && chunk i is not cached |
| 15          Caching_Procedure(i, $n_i$); |
| 16      END |
| 17      Forward chunk i to the next router; |

FIG. 11 is a flowchart illustrating an example of a method of transmitting a content in a content provider in a CCN. Referring to FIG. 11, in operation 1110, the content provider receives a content request packet from a content requester via nodes or routers. The content request packet may include content information and a hop count increasing in response to the content request packet being relayed from the content requester. The content information may include a name of the content, a size of the content, and/or a number of chunks constituting the content. The number of chunks constituting the content may be determined based on a transfer bitrate of a user link via which the content is to be transmitted and a playing bitrate of the content.

In operation 1120, the content provider selects one chunk from chunks constituting a portion of the content requested by the content requester, based on a chunk popularity. The chunk popularity may be an amount of requests for each of the chunks.

In operation 1130, the content provider generates a data packet including the selected chunk and a caching bit notifying a node caching the selected chunk.

In operation 1140, the content provider transmits the generated data packet to a node adjacent to the content requester. The content provider may transmit the selected chunk to the node adjacent to the content requester based on a value of the hop count.

For example, the content provider may store, in the data packet, the value of the hop count included in the content request packet. In response to the data packet being forwarded from the content provider to the content requester via the nodes, each of the nodes may decrease the value of the hop count in the data packet. A node having a minimum value of the hop count stored in the data packet may be understood as a node or an edge node adjacent to the content requester. In the aforementioned manner, the content provider may retrieve the node adjacent to the content requester, and may transmit the selected chunk to the retrieved node.

The various modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of caching a content in a node in a content-centric network, the method comprising:
    receiving, at the node and from a content requester, a content request packet requesting a first chunk of the content;
    setting a mark bit indicating whether the node is to cache the first chunk in response to the first chunk being received, the mark bit being set in a pending interest table of the node based on a request frequency of the first chunk;
    generating, by the node, another content request packet in which a booking bit is set, the booking bit requesting a next node to cache a second chunk of the content successive to the first chunk;
    transmitting the another content request packet to the next node;
    receiving, from a content provider via the next node, a data packet comprising the first chunk in response to transmitting the content request packet to the content provider; and
    caching the first chunk, wherein the caching of the first chunk comprises
    verifying whether the mark bit is set in a pending interest table of the node, and
    caching the first chunk in a content store of the node based on a result of the verifying,
    wherein in response to the another content request packet, the next node is configured to set another mark bit in a pending interest table of the next node, the another mark bit indicating whether the next node is to cache the second chunk in response to the second chunk being received, and forward the another content request packet in which the booking bit is cleared.

2. The method of claim 1, wherein the content request packet comprises a hop count configured to be increased in response to the content request packet being relayed from the content requester, and content information.

3. The method of claim 2, further comprising:
determining whether the node is adjacent to the content requester based on the hop count.

4. The method of claim 2, wherein the content information comprises a name of the content, or a size of the content, or a number of chunks constituting the content, or any combination thereof.

5. The method of claim 1, further comprising:
receiving, from the content provider, meta information of chunks constituting the content.

6. A non-transitory computer-readable storage medium storing instructions that, when executed by a processor, cause the processor to perform the method of claim 1.

7. A method of caching a content in a node adjacent to a content provider in a content-centric network, the method comprising:
receiving, by the node and from a content provider, a data packet comprising a first chunk of the content in response to transmitting, to the content provider, a content request packet requesting the first chunk;
caching a name of the first chunk;
setting a mark bit indicating whether the node is to cache the first chunk in response to the first chunk being received, the mark bit being set in a pending interest table of the node based on a request frequency of the first chunk;
generating, by the node, another content request packet in which a booking bit is set, the booking bit requesting a next node to cache a second chunk of the content successive to the first chunk;
generating, by the node, another data packet in which a caching bit is set, the caching bit notifying the next node that the node caches the first chunk; and
forwarding, to the next node, the another data packet, wherein in response to receiving the another data packet, the next node is configured to cache the name of the first chunk in a content store of the next node, and forward the another data packet in which the caching bit is cleared,
wherein the caching of the first chunk comprises:
updating a count indicating the number of times the first chunk is requested in response to receiving, from the content requester, another content request packet requesting the first chunk;
determining whether the updated count is greater than or equal to a preset threshold; and
caching the first chunk in a content store of the node based on a result of the determining.

8. The method of claim 7, wherein the data packet comprises a hop count configured to be increased in response to the data packet being relayed from the content provider.

9. The method of claim 8, further comprising:
determining whether the node is adjacent to the content provider based on the hop count.

10. The method of claim 7, further comprising:
forwarding the data packet to a next node.

11. The method of claim 7, further comprising:
caching a name of a second chunk of the content and successive to the first chunk in a content store of the node in response to receiving, from the content provider, a data packet comprising the second chunk.

12. The method of claim 11, wherein the generating of the other packet is in response to the caching of the name of the second chunk.

13. A method of transmitting a content in a content provider in a content-centric network, the method comprising:
selecting, based on a chunk popularity, a chunk from chunks constituting a portion of content requested from a content requester in response to receiving, from the content requester, a content request packet requesting the content; and
transmitting a data packet comprising the selected chunk and a caching bit notifying a node to cache the selected chunk to a node adjacent to the content requester,
wherein the content request packet comprises a hop count configured to be increased in response to the content request packet being relayed from the content requester, and content information, and to be decreased in response to a non-caching operation,
wherein the transmitting comprises transmitting the data packet to the node adjacent to the content requester based on the hop count, and wherein
the node is configured to set a mark bit indicating whether the node is to cache the selected chunk in response to the selected chunk being received, the mark bit being set in a pending interest table of the node based on a request frequency of the selected chunk, and generate another content request packet in which a booking bit is set, the booking bit requesting a next node to cache a second chunk of the content successive to the first chunk.

14. The method of claim 13, further comprising:
generating the data packet comprising the selected chunk and the caching bit notifying the node to cache the selected chunk.

15. An apparatus comprising:
a processor configured to
set a mark bit indicating whether the apparatus is to cache a first chunk of a content when the first chunk is received, in response to a content request packet requesting the first chunk being received, the mark bit being set in a pending interest table of the node based on a request frequency of the first chunk,
generate another content request packet in which a booking bit is set, the booking bit requesting a next node to cache a second chunk of the content successive to the first chunk,
transmit the another content request packet to the next node,
forward the content request packet, and
cache the first chunk in response to the mark bit being set and a data packet comprising the first chunk being received, wherein the caching of the first chunk comprises
verifying whether the mark bit is set in the pending interest table of the node, and
caching the first chunk in a content store of the node based on a result of the verifying, and
wherein in response to the another content request packet, the next node is configured to set another mark bit in a pending interest table of the next node, the other mark bit indicating whether the next node is to cache the second chunk when the second chunk is received, and forward the another content request packet in which the booking bit is cleared.

16. The method of claim 1, further comprising storing a chunk having a highest value of a request frequency in a node closest to the content requester, and storing chunks having lower values of request frequencies in nodes farther from the content requester.

17. The method of claim 13, further comprising caching the name of the first chunk in a name table of the node, in response to the caching bit of the chunk being set as "1" and $i<=m$, all of chunks from a first chunk to a $\max\{[(i-1)/m]*m, m\}$-th chunk being cached in the content store of the node, the node being a core node adjacent to the content provider and $i<=m$, or all chunks from the first chunk to the $\max\{[(i-1)/m]*m, m\}$-th chunk being cached in the content store of the node, wherein i is a chunk of the content and m is a number of chunks of the content.

18. The method of claim 1, wherein a number of chunks is determined based on a transfer bitrate of a user link via which the content is to be transmitted and a playing bitrate of the content, and a distance between a chunk and the content requestor varies inversely with the popularity of the chunk.

19. The method of claim 7, further comprising simultaneously receiving, at the node from the next node, the first chunk, while the next node is transmitting an interest requesting the next chunk and receiving the next chunk.

20. The method of claim 7, wherein a number of chunks requested by the next node is less than a number of chunks requested by the node.

* * * * *